Sept. 22, 1925.
J. H. LUCAS
SWIVELING TROLLEY HARP
Filed Aug. 27, 1923
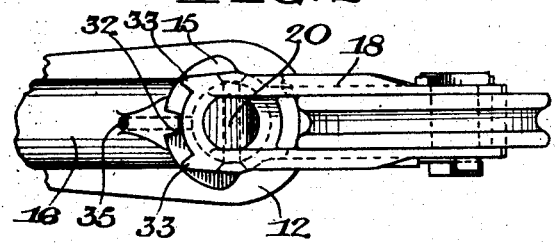
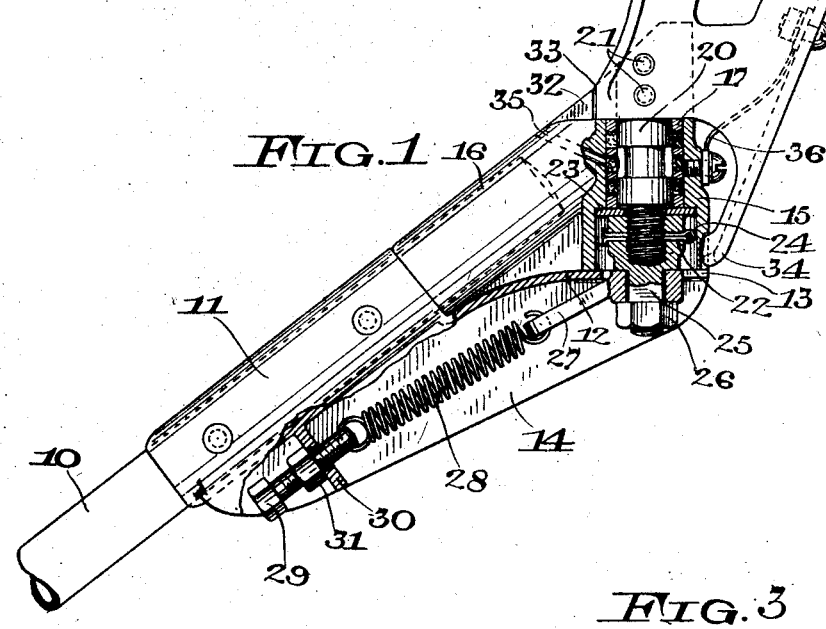
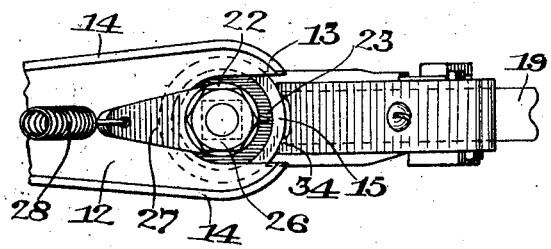

Patented Sept. 22, 1925.

1,554,359

UNITED STATES PATENT OFFICE.

JOHN H. LUCAS, OF MILWAUKEE, WISCONSIN, ASSIGNOR TO THE MILWAUKEE ELECTRIC RAILWAY & LIGHT COMPANY, OF MILWAUKEE, WISCONSIN, A CORPORATION OF WISCONSIN.

SWIVELING TROLLEY HARP.

Application filed August 27, 1923. Serial No. 659,614.

*To all whom it may concern:*

Be it known that I, JOHN H. LUCAS, a citizen of the United States, and resident of Milwaukee, in the county of Milwaukee and State of Wisconsin, have invented new and useful Improvements in Swiveling Trolley Harps, of which the following is a description, reference being had to the accompanying drawings, which are a part of this specification.

This invention has for its object to provide a trolley harp with a swivel joint that will permit the shoe or wheel to remain in the plane of the trolley wire though the trolley pole is considerably at an angle thereto.

This swiveling harp is particularly designed for use on equipment where the trolley base cannot be located directly above the truck center and where the angularity between the trolley wire and the trolley pole is severe enough to produce a condition tending to dewirements. The swiveling harp allows the contact to hold a position parallel to the trolley wire, and thus reduces the tendency for the trolley to leave the wire.

The invention also has for its object to perfect details of construction of such a trolley harp and to provide guards to prevent span wires catching thereon at time of dewirement and an automatic aligning device which is easily and quickly adjusted.

With the above and other objects in view the invention consists in the swiveling trolley harp as herein claimed, its parts and combinations of parts and all equivalents.

Referring to the accompanying drawings, in which like characters of reference indicate the same parts in different views, Fig. 1 is an elevation partly in section of a swiveling trolley harp constructed in accordance with this invention;

Fig. 2 is a plan view thereof, and

Fig. 3 is a bottom view.

In these drawings, 10 indicates a trolley pole having riveted or otherwise secured to it at a short distance from its end a bracket member 11 having an inclined tubular portion to fit around the pole and an approximately horizontal shelf-like portion 12 with an opening 13 and downwardly extending side flanges 14 which form a spring housing between them. A bearing member 15 rests on the shelf-like portion of the bracket 11 and has an angular tubular extension 16 fitting on the end of the trolley pole. This bearing member 15 has a reduced or shouldered vertical bore in the reduced portion of which is fitted a bushing 17 held securely thereto by having a pressed fit therein and containing openings packed with graphite for lubrication.

Seated on the bearing member 15 is the harp member 18 carrying the trolley shoe 19 or a trolley wheel. This harp member has a swivel connection with the bearing member 15 by means of a vertical pivot stud 20 secured thereto as by rivets 21 and fitting within the bushing 17. A nut member 22 threaded on the end of the stud 20 and bearing on a washer 23 against the shoulder of the bore of the bearing member serves to secure the harp member against displacement, a cotter pin 24 being passed through said nut member and stud. The nut member is contained within a recess in the bottom of the bearing member but projects therefrom through the opening in the end of the bracket member 11 and such projection is provided with a squared portion 25 and a threaded end on which is turned a nut 26.

A crank arm 27 fits on the squared portion 25 of the nut member 22 and is held in place by the nut 26 and its end is connected by a coiled spring 28 to an adjusting screw 29 which passes through an opening in a cross web 30 between the flanges 14 of the spring housing with a nut 31 threaded on it for adjusting the tension of the spring.

As seen in Fig. 2, the bearing member 15 is provided with a stop lug 32 in the path of travel of a pair of stop shoulders 33 on the harp member, thus limiting the extent of the swiveling action, while the spring 28 tends to hold the harp in its intermediate position, as shown.

The harp member has a downwardly extending projection 34 forked at its end to embrace the cylindrical surface of the bearing member and constitutes a guard for preventing engagement with tie-wires in the event of dewirement. All shoulders are rounded to give the entire device a streamline effect for the same purpose.

An oil hole 35 in the bearing member leads to one of the holes in the bushing 17 to supply the swivel stud with lubricant and a flexible jumper or shunt 36 connects the bearing member with the harp to insure conductivity notwithstanding the swivel joint.

In operation an angular position of the trolley pole with respect to the vertical plane of the trolley wire, as when the car rounds a curve, will not be imparted to the trolley shoe or wheel because of the swivel connection which permits the flanged engagement of the trolley shoe or wheel with the wire to retain the harp in approximately the vertical plane of the wire. This swinging of the harp is accomplished against the tension of the spring 28 which therefore serves to restore the parts to their normal relation with the harp in line with the pole when the emergency has passed or whenever the pole is drawn out of engagement with the wire. This flexibility avoids dewirement at curves even in the case of three truck two car trains where the intermediate truck is located at the pivoting point and it is therefore impossible to locate the trolley base above the truck center.

The spring action with which the trolley harp is restored to its alignment with the pole may be readily adjusted to suit the requirements by the turning of nut 31 on the adjusting screw 29.

Whenever it is desired to remove the contact mechanism from the pole for inspection or repairs, the spring 28 may be disconnected from the crank arm which permits the bearing member to slide off of the end of the trolley pole, the parts mounted on the nut 22 passing freely through the open slot of the bracket member.

What I claim as new and desire to secure by Letters Patent is:

1. In a trolley, a trolley pole, a bracket member secured thereto and provided with an approximately horizontal projection, a bearing member removably fitting on the end of the trolley pole and seated on the projection of the bracket member and having an approximately vertical bore, a harp having a swivel stud fitting in said bore of the bearing member, a contact member carried by the harp and a spring for holding the harp in a normal position on the bearing member and serving to hold the bearing member seated on the bracket member.

2. In a trolley, a trolley pole, a bracket member secured thereto and provided with an approximately horizontal projection, a bearing member fitting on the end of the trolley pole and seated on the projection of the bracket member and having a shouldered bore, a bearing bushing fitting in the bore, a harp having a swivel stud fitting in the bushing, a nut threaded on the end of the stud, a washer confined between the nut and the shoulder of the bore and bearing on the end of the bushing, a shouldered and threaded projection on the nut, a crank-arm secured to the shouldered projection, a nut threaded on the projection, an adjusting screw mounted on the bracket, a spring connecting the adjusting screw and the crank-arm, and a contact member carried by the harp.

3. In a trolley, a bracket member adapted to be mounted on an inclined trolley pole and having an approximately horizontal slotted projection, a bearing member seated on the projection and having a tubular extension to fit over the end of the trolley pole, a harp having a stud fitting in an approximately vertical bore of the bearing member to form a swivel connection, a crank-arm carried by the stud, an adjusting screw on the bracket, a spring connecting the crank-arm with the adjusting screw, stop lugs on the bearing member and the harp for limiting the swiveling movement of the harp, a depending projection on the harp for engaging the bearing member near the bracket, and a contact member carried by the harp.

4. In a trolley, a bracket member adapted to be mounted on an inclined trolley pole and provided with an approximately horizontal slotted projection, a bearing member seated on the projection and adapted to fit over the end of the trolley pole, a harp having a swivel stud fitting in an approximately vertical bore of the bearing member, means on the stud projecting through the slot of the bearing member and forming a crank-arm, a spring connecting the crank-arm with the bracket and capable of being detached therefrom for permitting removal of the bearing member, and a contact member carried by the harp.

In testimony whereof I affix my signature.

JOHN H. LUCAS.